C. REDD.
CARTON WEIGHING AND FILLING MACHINE.
APPLICATION FILED AUG. 7, 1914.
1,140,915. Patented May 25, 1915.
6 SHEETS—SHEET 4.
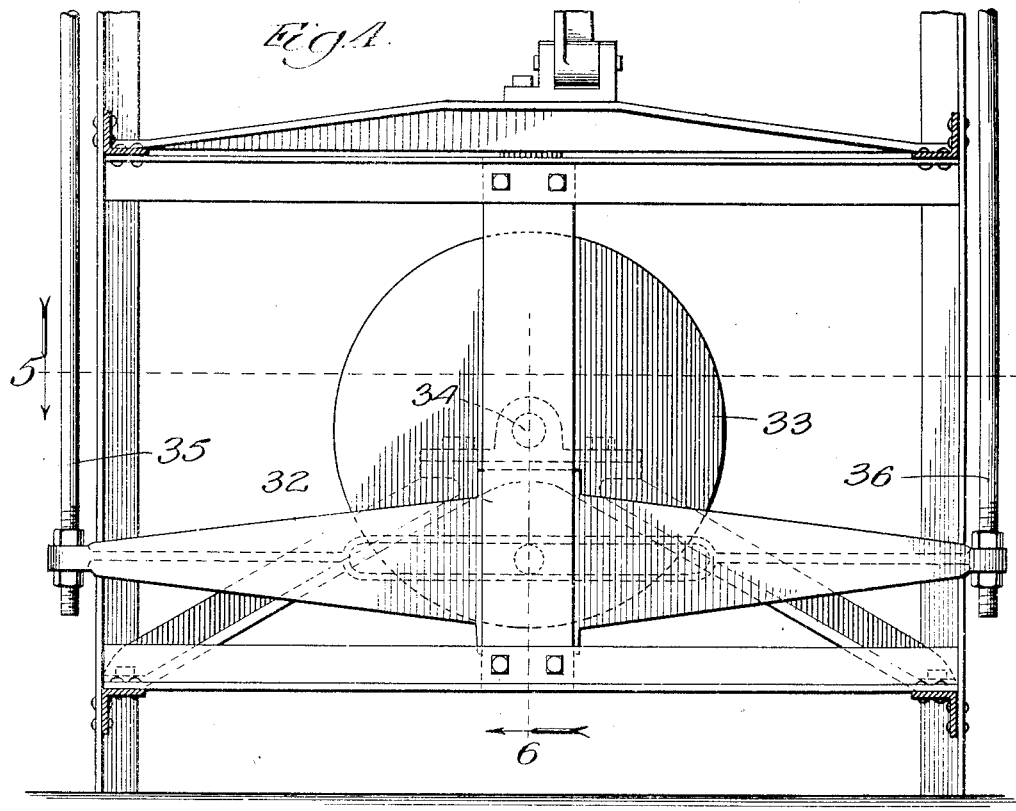
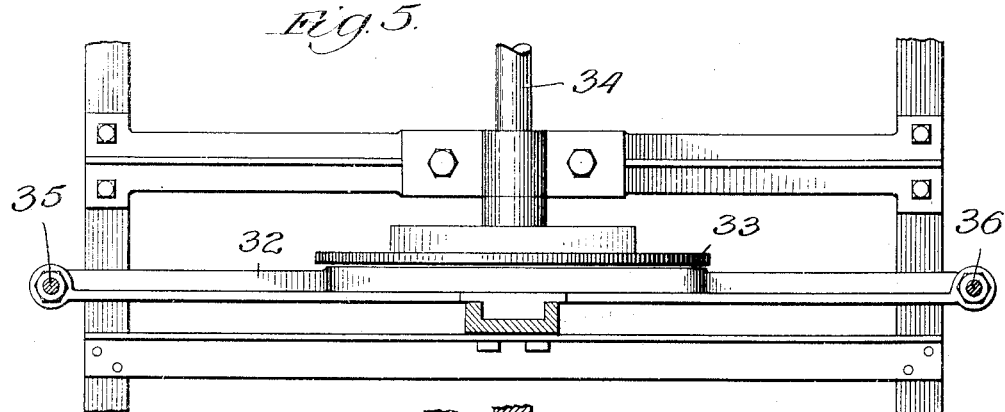
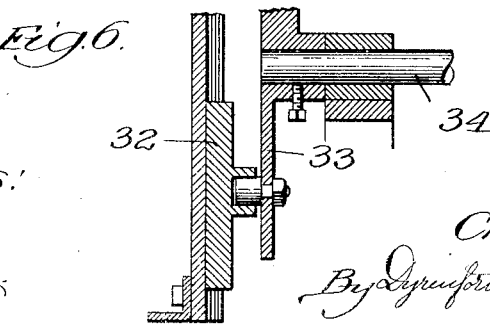
Witnesses:
Inventor:
Charlie Redd,
By Dynenforth, Lee, Chritton & Wiles,
Attys.

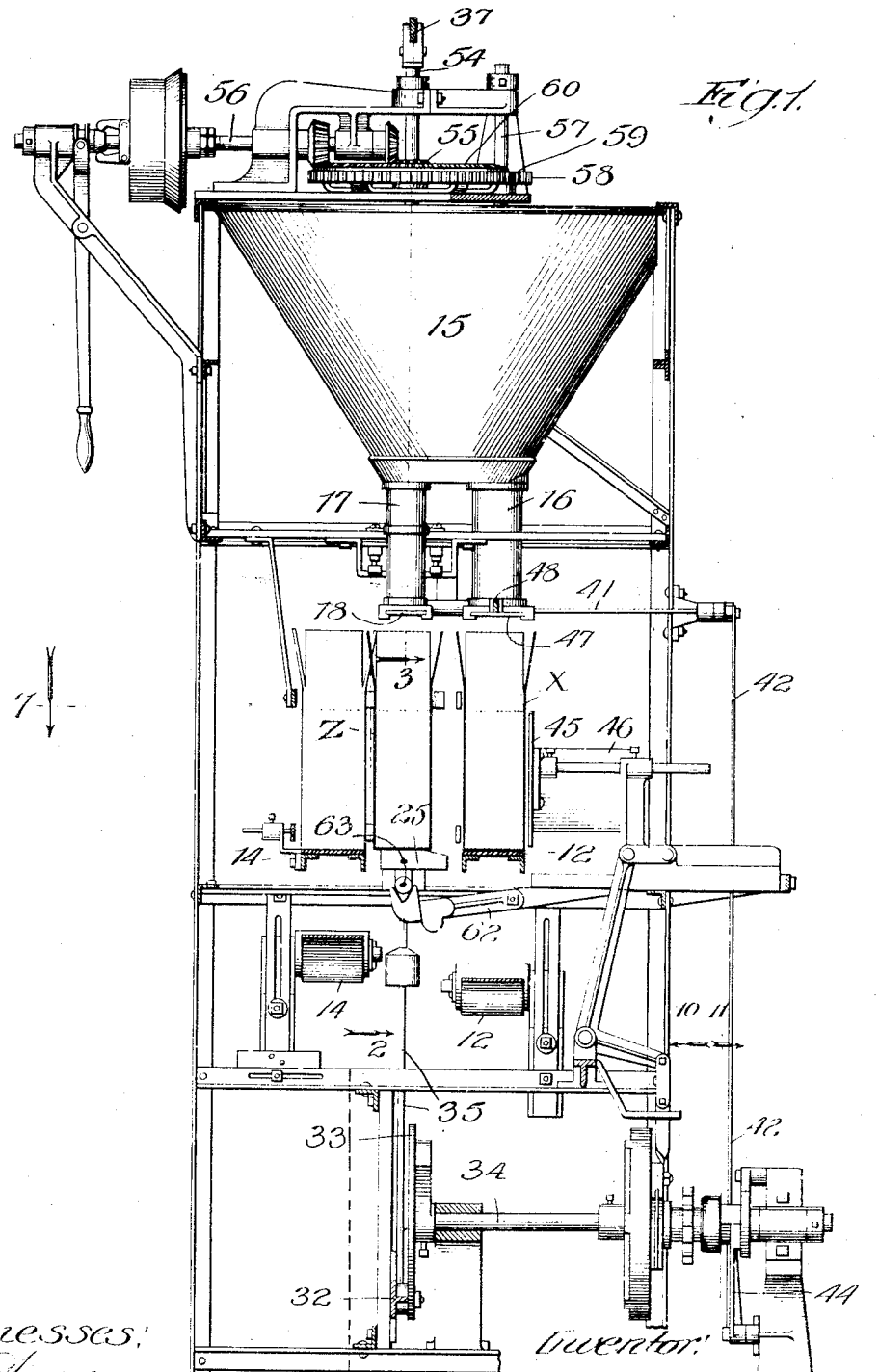

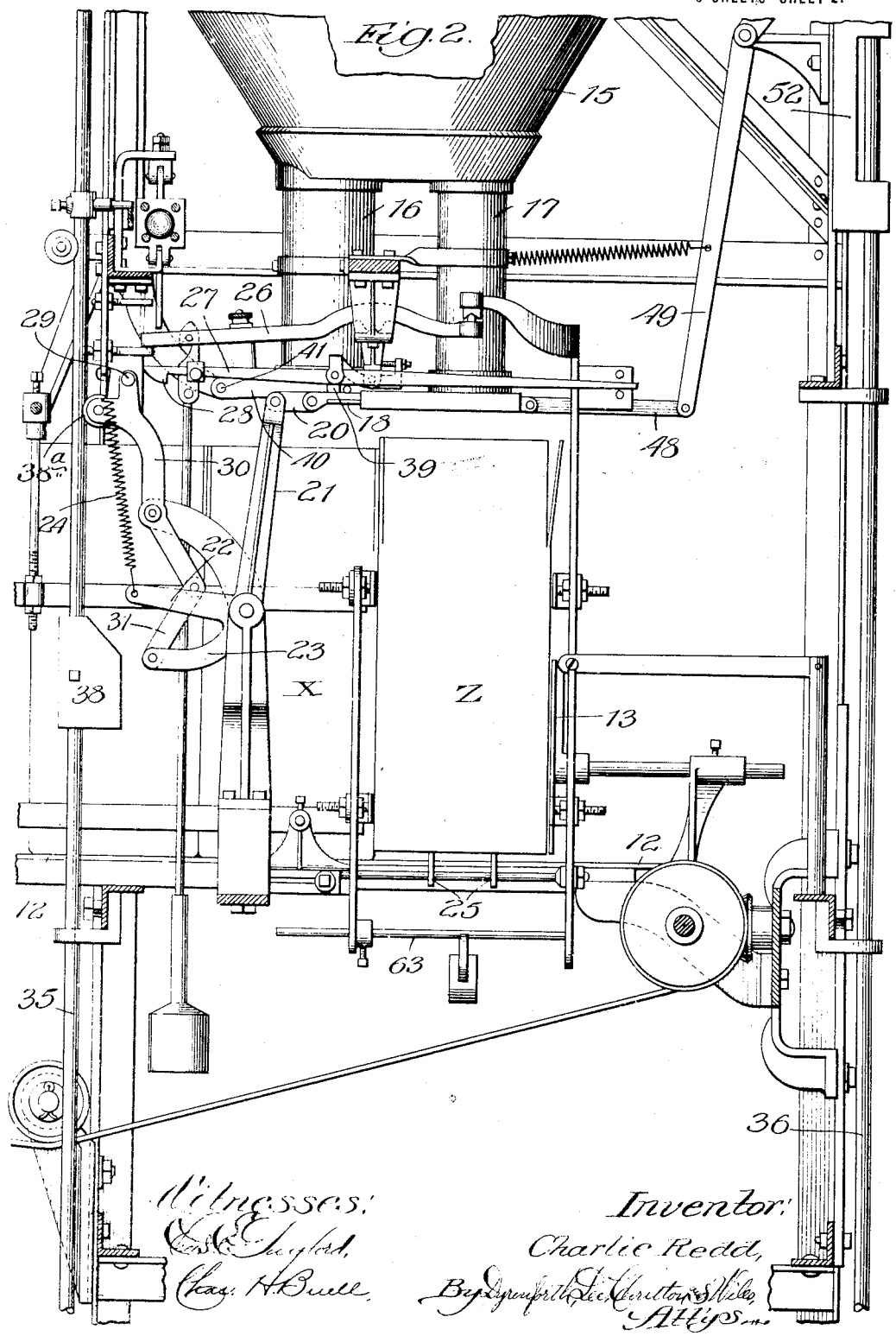

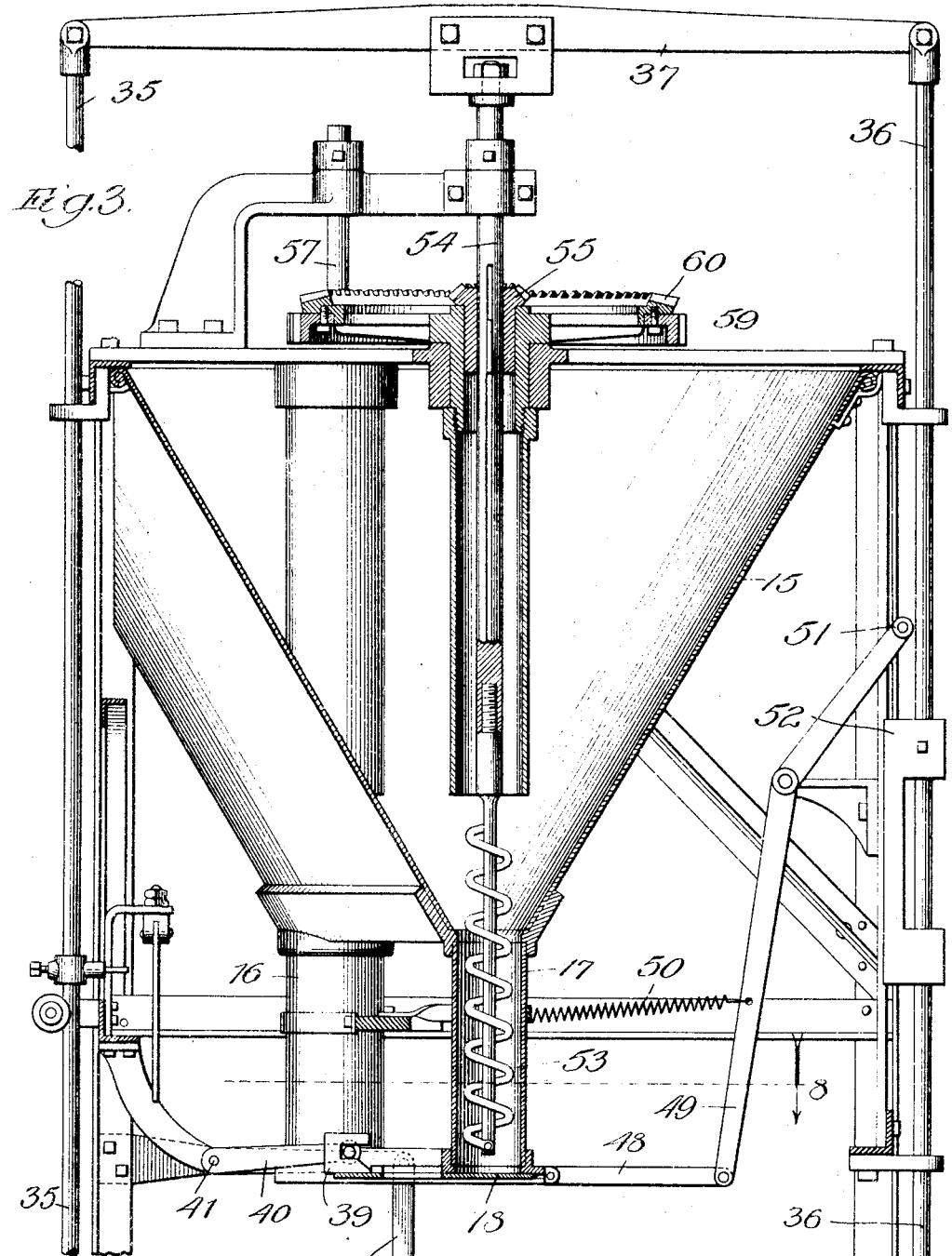

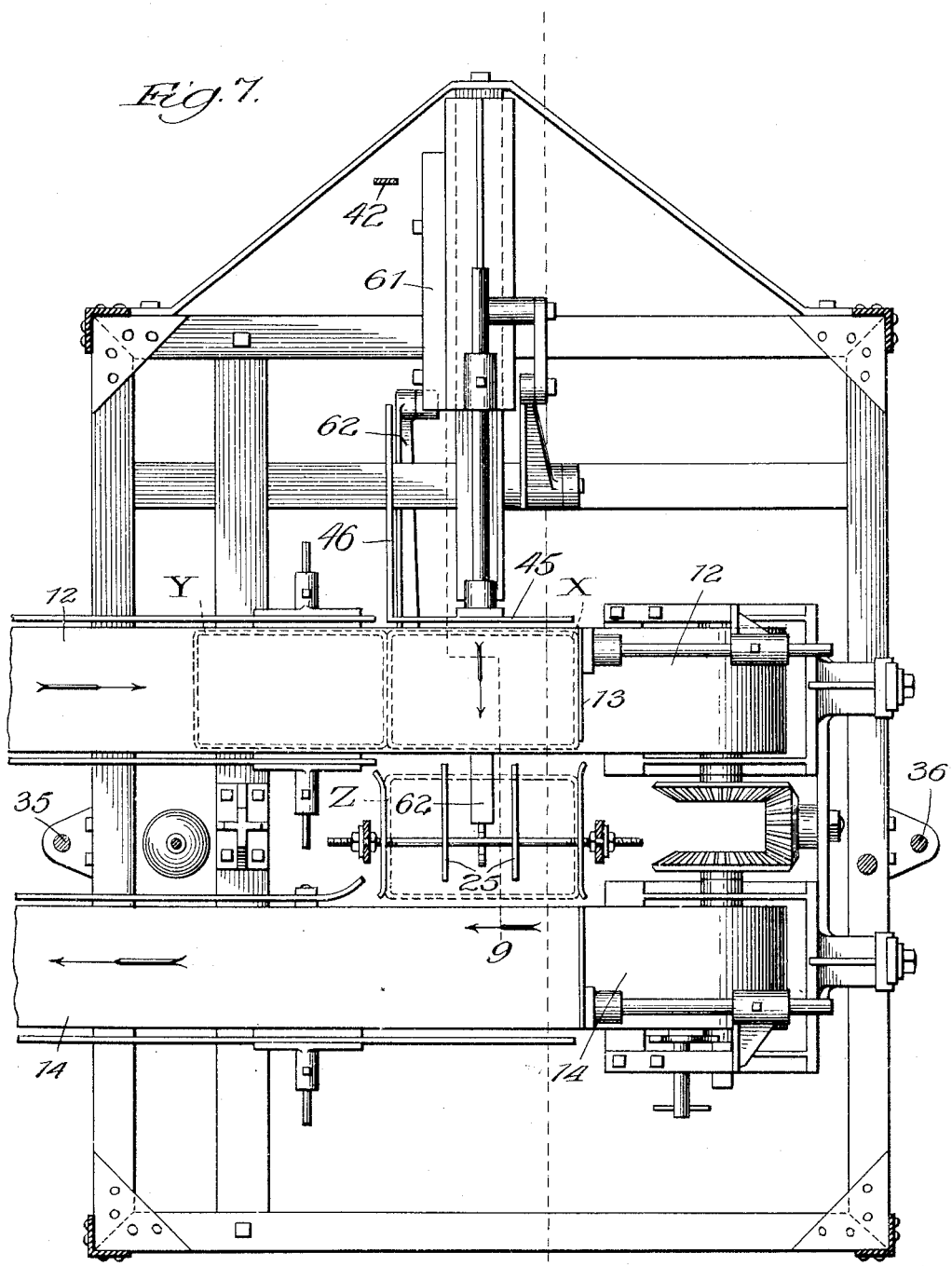

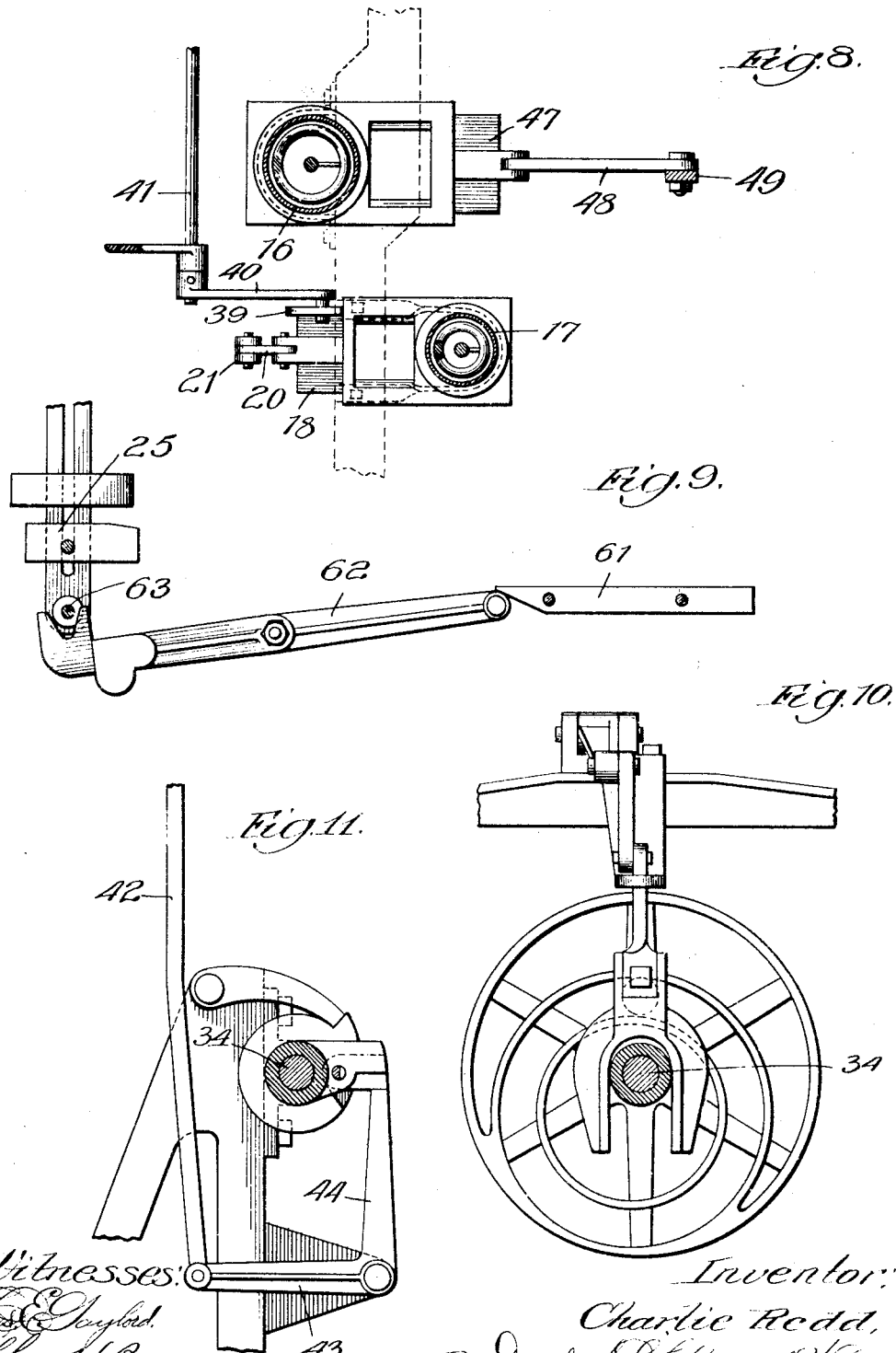

UNITED STATES PATENT OFFICE.

CHARLIE REDD, OF CHICAGO, ILLINOIS, ASSIGNOR OF ONE-HALF TO ISAAC PIESER AND ONE-HALF TO CHARLES G. LIVINGSTON, BOTH OF CHICAGO, ILLINOIS.

CARTON WEIGHING AND FILLING MACHINE.

1,140,915. Specification of Letters Patent. Patented May 25, 1915.

Application filed August 7, 1914. Serial No. 855,617.

*To all whom it may concern:*

Be it known that I, CHARLIE REDD, a citizen of the United States, residing at Chicago, in the county of Cook and State of Illinois, have invented a new and useful Improvement in Carton Weighing and Filling Machines, of which the following is a specification.

My invention relates to certain new and useful improvements in carton weighing and filling machines, and is fully described and explained in the specification and shown in the accompanying drawings, in which the present machine in many of its features of construction follows the plan of that shown in my application filed October 7, 1912, Serial No. 724,370 and more particularly the modified form of weighing mechanism shown in Figures 33 to 41, inclusive, of said application. By reason of this similarity and the fact that many of the principal operating parts are duplicates of those there shown, it has not been deemed necessary here to illustrate all the details.

In the accompanying drawings, Fig. 1 is a sectional elevation of the machine, the section being taken on the line 1 of Fig. 7; Fig. 2 is a longitudinal section on the line 2 of Fig. 1; Fig. 3 is a longitudinal section on the line 3 of Fig. 1; Fig. 4 is a section on the line 4 of Fig. 1; Fig. 5 is a horizontal section on the line 5 of Fig. 4; Fig. 6 is a vertical longitudinal section on the line 6 of Fig. 4; Fig. 7 is a horizontal section on the line 7 of Fig. 1 on an enlarged scale; Fig. 8 is a horizontal section on the line 8 of Fig. 3; Fig. 9 is a vertical transverse section on the line 9 of Fig. 7, and Figs. 10 and 11 are vertical transverse sections on the lines 10 and 11, respectively, of Fig. 1, looking in the directions of the respective arrows.

The cartons to be filled by my machine enter on a longitudinally moving feed belt 12 at the rear. The end carton of the series is arrested by a stop 13 (Fig. 7) when in the position shown by dotted lines and marked X, the succeeding carton then resting against it in the position Y, where it receives its initial charge of material. At suitable intervals, and under the influence of transferring mechanism presently to be described, the carton in the position X is shifted forward to the position marked Z, Fig. 7, where it rests upon a scale-pan and receives a final charge of material. After this forward movement of the carton in the position X, and the retraction of the feeding mechanism, the carton at Y moves up to X and another carton moves to the position Y. On the next succeeding operation of the feeding mechanism, each carton moves forward one step, the carton upon the scale-pan moving off onto a feed-belt 14, which carries it away from the machine. In the parts thus far enumerated, there is nothing requiring detailed description, the feed-belts being of ordinary form and these parts being substantially as shown in the application heretofore mentioned. This brief statement of the cycle of operation, however, will make clear the following detailed description of the mechanism whereby the results thus broadly stated are accomplished.

Above the path of the cartons is mounted a hopper 15 having at its lower end two chutes or tubes 16 and 17 diagonally disposed with reference to each other, the tube 16 being for the initial charge and being located above the position of the carton marked Y in Fig. 7, and the tube marked 17 being for the final feed and being above the scale-pan. The tube 17 is closed by a valve 18 connected by a link 20 to the upper end of a bell-crank lever 21 having an intermediate arm 22 and a lower arm 23, the intermediate arm serving as means for the attaching of a spring 24 which tends normally to hold the upper end of the lever 21 to the right, as viewed in Fig. 2, that is, in a position where the valve is closed.

25 is the scale-pan supported, exactly as set forth in the prior application, by a scale-beam 26, whose arrangement is that of the modified form of Figs. 33 to 39 of said application. Since no novelty inheres in the scale construction as herein shown, it will not be described except to say that the scale mechanism is steadied during the initial deposit of material in the carton and released from said steadying mechanism exactly as set forth in said application, and when the carton is sufficiently filled to depress the scale-pan and tilt the beam, it elevates the left-hand end of a locking-bar 27 having a hook 28 at its free end. This hook is adapted to engage a pin 29 on the upper end of a lever 30, connected at its lower end by a link 31 with the lower arm of the lever 21. When the lever 30 has its upper end pushed to the right (viewing the machine in the same direction as in Fig. 2) so as to hook under the hook 28 on the end of the locking-bar, the valve 18 is held open in an obvious manner. When the scale is depressed by the increasing weight of the carton, the hook on the locking-bar rises releasing the lever 30 and permitting the spring 24 to rotate the lever 21 and close the valve, thus cutting off the stream of material, all these parts operating like the corresponding parts in said application.

Surrounding the frame of the machine is the reciprocable device of said application. At the bottom there is the cross-head 32 adapted to be reciprocated vertically by engagement with a pin on a rotatable wheel 33 mounted on a shaft 34. The cross-head is connected by side-bars 35, 36 with a transverse-beam 37 at the top of the structure. The side-bar 35 has a cam-block 38 for engaging a roller 38ᵃ on the upper end of the lever 30 to move said upper end inward or to the right viewing the machine in the same direction as in Fig. 2 for the purpose of opening the valve and engaging the pin 29 with the hook 28 on the locking-bar 27 to hold the valve open.

As set forth in said application, the shaft 34 which drives the cross-head makes a single revolution and then stops, a one-revolution clutch being used for this purpose, said clutch being preferably of the identical form shown in Figs. 16–19 in said application. For the purpose of operating this clutch so as to start the cycle of operation as the valve 18 closes, said valve carries a cam-block 39 (Fig. 3), which, when the valve is closed, elevates the hand of the lever 40 mounted on a rock-shaft of a lever 41. The opposite end of this rock-shaft is operatively connected to elevate a link 42 connected to one arm 43 of a bell-crank lever (see Fig. 11), the opposite end 44 of which engages the clutch mechanism to stop the rotation of the shaft 34 when in the position shown in Fig. 11. When the valve 18 closes, its operation is to swing the arm 44 free from the clutch so as to start the shaft in motion, and the sequence of operations commences.

The carton-shifting mechanism, like other parts heretofore mentioned, is generally similar to that shown in the application, its operative end being designated by the character 45 and the connections between the same and the shaft being substantially as shown and described in said application. Thus immediately upon the closing of the valve, the carton-shifting mechanism operates, pushing forward the partially filled carton onto the scale-pan, there to receive a further charge and immediately thereafter the valve is opened and locked open by the mechanism set forth. In the meantime the following carton is in the position marked Y, where it is held by engagement with a backward extension 46 on the shifter 45. The shifter then retreats permitting the carton in the position Y to move into the division X and thereafter the valve is closed by the action of the scale-beam.

It will be evident that after the scale-pan has moved down under the weight of a carton, it will have descended below the level of the belts which are both in the same plane, therefore the feed of the next carton can take place only by restoring it to the proper level. This is accomplished by means of a cam 61 (Fig. 9) carried by the shifting device 45. As the shifting device moves forward, this cam strikes a lever 62, the front end of which engages the cross-bar 63 on the scale-pan to raise it. The continued forward movement of the shifting device then operates in the proper manner upon the cartons. It will now be evident that in order to receive its charge when in the position marked Y, the other tube or chute 16 opening into the hopper must be opened and closed during the rotation of the shaft and finished prior to the retreat of the shifter. This result is accomplished as follows: The valve holding the chute 16 is indicated by the character 47 (Fig. 8). It is connected by a link 48 with a lever 49, a spring 50 serving normally to hold the valve closed. The upper end of the lever 49 carries a roller 51 adapted to be engaged by a block 52 on the side-bar 36 heretofore described as vertically reciprocated by the movement of the cross-head. Thus during the topmost position of the cross-head, and therefore while the carton shifter is advanced, the tube or chute 16 is opened and closed.

For the purpose of feeding material from the hopper down the tubes or chutes 16 and 17, each is provided with a rotatable auger-like feed-screw, only one of which is illustrated in detail, that mounted in the tube 17 being shown in Fig. 3 and designated 53. This is mounted upon a shaft 54 feathered to a beveled pinion 55 constantly driven by a shaft 56. The shaft 54 is connected with the cross-beam 37 so as to be vertically reciprocated therewith, all as shown and for the purpose described in my preceding application. The feed-screw in the tube 16 is mounted on a shaft 57 feathered to its gear 58, as is the shaft 54, but unprovided with means for imparting positive reciprocation to it. Thus the shaft 57 may rise when it has sufficiently packed the material beneath it in the chute 16, and thus will exert no undue pressure thereon, but it rises only when forced up by such an accumulation of material. The shaft 54 is driven from a gear 59 fast on a larger gear 60 receiving motion likewise from the shaft 56. By this mechanism it will be seen that the material is fed to the initial tube or chute 16 in a constant stream, so that the carton receives its charge with certainty.

The present machine is thus seen to be practically the same as that of my prior application referred to, excepting for the provision of the initial chute 16 and its operating mechanism. The present mechanism is preferred to that shown in that application for the reason that it permits a much higher speed of operation. With that machine, if the speed be greatly accelerated, the single chute or tube does not receive its charge with sufficient rapidity. In that machine the screw operating constantly will feed any given material only at a certain fixed rate. The cartons can not be supplied to the machine at a faster rate than the material will be fed and it is found in practice that, especially with certain materials like flour, which do not flow very freely, the machine does not work as fast as it would otherwise be quite convenient to reciprocate the moving parts. In the present machine this difficulty is entirely overcome by providing two separate chutes, each of which is filling with material during the periods when the valves are closed, so that twice as much material is fed from the machine in the same time. As a result, when the accumulated material is pushed out of the second chute 17, by the descent of its screw-feeding device, the carton is practically full and it will tilt the scale-beam with the very slightest addition to the normal rotation of the feeding device. With the prior machine, although the feeding device operated continuously, it was found with certain materials like flour that when the valve had closed and re-opened after the shift of the package, the amount of material which had accumulated in the chute was relatively small and a very large part of the contents would have to be made up by an unnecessary dwell on the carton under the chute. In an obvious manner the use of the two chutes takes care of this difficulty.

The present device is by no means the common expedient of the use of a bulk-feed followed by a drip-feed. On the contrary, the feed from the second chute is exactly the same in character as from the first, but the intention of the present device is to do double the amount of feeding while the valves are closed, in order that the dwells, when the valves are opened, may be reduced to a minimum.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

I claim as new and desire to secure by Letters Patent,—

1. In combination, an initial and a final feeding chute, a valve to close each chute, a scale beneath the final chute, means to position cartons successively beneath said chutes, a material-feeding screw in each chute, means for driving said screws continuously whereby the material is husbanded in the chutes while each is closed, means to open the valve of the final chute after a carton is in place thereunder, scale-controlled means to close the valve of the final chute, and means to open and close the initial chute while the carton is stationary.

2. In combination, an initial and a final feeding chute, a valve to close each chute, a scale beneath the final chute, means to position cartons successively beneath said chutes, a material-feeding screw in each chute, means to rotate said screws, means positively to reciprocate the feeding screw in the final chute, for the purpose set forth, means to open the valve of the final chute after a carton is in place thereunder, scale-controlled means to close the valve of the final chute, and means to open and close the initial chute while the carton is stationary.

3. In combination, an initial and a final feeding chute, a valve to close each chute, a scale beneath the final chute, means to position cartons successively beneath said chutes, a feed-screw in each chute, means to drive said screws continuously, the feed-screw in the initial chute being adapted to rise longitudinally when material accumulates beneath it, means to open the valve of the final chute after a carton is in place thereunder, scale-controlled means to close the valve of the final chute, and means to open and close the initial chute while the carton is stationary thereunder.

4. In combination, an initial and a final feeding chute, a valve to close each chute, a scale beneath the final chute, means to position cartons successively beneath said chutes, a feed-screw in the final chute, means constantly to rotate and to reciprocate said feed-screw for the purpose set forth, means to open the final chute after a carton is in place thereunder, scale-controlled means to close the valve of the final chute, and means to open and close the initial chute while the carton is stationary thereunder partially to fill the cartons, for the purpose set forth.

5. In a device of the class described, a vertically movable scale-pan upon which the cartons rest, surfaces on the two sides of the scale-pan upon which the cartons approach and leave the pan, said surfaces being located at the normal level of the scale-pan, means to feed the cartons successively from the first of said surfaces to the scale-pan and from the scale-pan to the second of said surfaces, and means operated by the feeding-mechanism for elevating the scale-pan to its normal level while a loaded carton is in place thereon.

In testimony whereof I have hereunto set my hand this 5th day of August, 1914.

CHARLIE REDD.

In presence of two subscribing witnesses:
L. HEISLAR,
E. D. STEELE.

Copies of this patent may be obtained for five cents each, by addressing the "Commissioner of Patents. Washington, D. C."